United States Patent [19]

Ridgway, Jr. et al.

[11] 3,885,050
[45] May 20, 1975

[54] TREATMENT OF PROTEIN - CONTAINING MICROBIAL CELLS TO REMOVE UNDESIRABLE FLAVOR AND ODOR SUBSTANCES

[75] Inventors: John A. Ridgway, Jr., La Porte, Ind.; Kwei C. Chao, Naperville, Ill.

[73] Assignee: Standard Oil Company, Chicago, Ill.

[22] Filed: Feb. 13, 1974

[21] Appl. No.: 442,247

Related U.S. Application Data

[63] Continuation-in-part of Ser. No. 285,848, Sept. 1, 1972, abandoned, which is a continuation-in-part of Ser. No. 64,866, July 24, 1970, abandoned.

[52] U.S. Cl. ............... 426/60; 195/3 H; 195/82; 195/96; 426/364; 426/429; 426/456; 426/521
[51] Int. Cl. ..... C12c 11/18; C12c 11/30; A23j 1/18
[58] Field of Search ....... 426/429, 364, 60, 62, 148, 426/147, 456, 465, 521; 195/3 H, 28, 74, 82, 96

[56] References Cited
UNITED STATES PATENTS

| | | | |
|---|---|---|---|
| 1,869,721 | 8/1932 | Sure | 424/195 |
| 2,193,876 | 3/1940 | Maizel | 99/97 X |
| 2,904,439 | 9/1959 | Cooper et al. | 426/431 X |
| 2,921,854 | 1/1960 | Parker | 426/147 |
| 3,268,419 | 8/1966 | Champagnat | 195/3 H |

*Primary Examiner*—David M. Naff
*Attorney, Agent, or Firm*—Werten F. W. Bellamy; Arthur G. Gilkes; William T. McClain

[57] ABSTRACT

Protein-containing microbial cells are treated to remove undesirable flavor and odor substances by a process involving heat-killing the cells, drying the cells, extracting the dried cells with an aqueous alcoholic solution containing 60 to 80 vol. percent of an alcohol such as ethanol, filtering to separate the extracted microbial cells from the aqueous alcoholic solution and drying the extracted microbial cells to provide substantially solvent-free microbial cells.

24 Claims, No Drawings

TREATMENT OF PROTEIN - CONTAINING MICROBIAL CELLS TO REMOVE UNDESIRABLE FLAVOR AND ODOR SUBSTANCES

CROSS-REFERENCE TO RELATED APPLICATIONS

This application is a continuation-in-part of application Ser. No. 285,848, filed Sept. 1, 1972, which in turn is a continuation-in-part of Ser. No. 64,866, filed July 24, 1970, both now abandoned.

BACKGROUND OF THE INVENTION

In recent years much attention has been directed toward the development of new sources of protein which can be incorporated in foods or food additives suitable for human consumption. Rapid increases in world population have made the continued dependence on traditional sources of protein highly impractical. Moreover, the supply of protein from typical sources of protein, such as animal meat and certain vegetables, is inadequate to provide balanced diets sufficient to satisfy the needs of humans throughout the world.

One possible solution to the problem of supplying the ever-increasing need for food protein is provided by processes for the bio-synthetic manufacture or protein through the growth of microorganisms on various carbon-affording substrates. It is known, for example, that microorganisms such as bacteria and yeasts, which are grown by single-cell reproduction, contain high proportions of proteins and can be utilized directly in foods as a whole-cell material or can be treated to recover protein isolate. Recent efforts have shown that such microorganisms, grown on hydrocarbon substrates, can be successfully used in amimal feeds. As yet these microorganisms have not been commercially accepted in food preparations suitable for human consumption.

Single-cell protein (SCP) as normally produced has a distinctive flavor and odor that limits its use in foods intended for human consumption despite its admittedly attractive nutritional value. Part of the flavor problem appears to be associated with the lipids present in the microorganisms.

Past attempts to achieve acceptable flavor and odor characteristics in single-cell microbial products have employed both chemical and physical treatments, alone or sequentially, following an initial water wash of the harvested cells. For example, brewer's yeast is debittered by washing with diluted alkaline reagents. In the processing of microorganisms grown on hydrocarbons, residual hydrocarbon substrate and lipid concentrations have been reduced by solvent extraction with organic solvents exhibiting good solubility for fats and sterols. As disclosed in U.S. Pat. No. 3,268,419 such solvents include alcohols, light hydrocarbons such as benzene, ethers, ketones, chlorinated solvents and liquefied petroleum gases. A preferred solvent system for removal of hydrocarbons as well as lipids comprises an azeotrope of hexane with ethanol or isopropanol. The water content of the microorganism cream is reduced by drying or by a prior washing with a polar solvent such as ethanol or isopropanol. Similarly, the process of U.S. Pat. No. 3,268,412 removes residual hydrocarbon substrate from ruptured microbial cell material or cell wall residue by extraction with a hydrocarbon or hydrocarbon-alcohol solvent optionally preceded by extraction with an alcohol such as ethanol.

Bland flavor characteristics have been achieved with vegetable protein, derived, for example, from de-oiled soybean material, by wetting with ethanol, dissolution in strong caustic alkali and finally precipitation with acid. Such extensive treatment, as disclosed in U.S. Pat. No. 3,043,826, adds significantly to the cost of product, especially because only a minor portion of the total vegetable protein is recovered in the purified form.

In an extraction process affording a food-grade protein-rich product care must usually be taken to remove all of the organic extraction solvent. Accordingly, the choice of solvent is limited to those possessing a suitably high volatility preferably coupled with a very low toxicity. One exceptional situation exists where ethanol, an accepted food-grade substance in itself, is employed as the extractant.

Such treatments tend to involve a plurality of processing steps which add significantly to the cost of the food or food ingredient thereby produced. A need has continued to exist for an inexpensive, simple yet effective process for affording an acceptable quality food-grade SCP material for human consumption.

SUMMARY OF THE INVENTION

One object of our invention is to provide an improved process for removal of undesirable flavor and odor components from single-cell, protein-containing microbial products.

Another object of our invention is to provide a bland single-cell protein (SCP) material of a quality suitable for use in foods intended for human consumption.

The process of our invention is broadly applicable to SCP materials and is especially applicable to bacteria and yeasts with particular emphasis on the latter.

In one aspect of the practice of this invention, the single-cell protein materials are heat-killed prior to its use in the present process.

The single-cell protein materials are heat-killed by subjecting the said materials to a pasteurization process prior to drying the material to a moisture content no greater than about 8 wt. percent.

In order to heat-kill the viable cells of the single-cell protein material by pasteurization, the said material is heated (1) for 30 seconds at temperatures ranging from about 159° to 178°F; (2) for 1 minute at temperatures ranging from about 156° to 174°F; or (3) for 5 minutes at from about 151° to 168°F.

In another aspect of the present invention, the single-cell protein materials derived from single-cell microbial organisms grown by fermentation on a suitable substrate are not heat-killed prior to using the same in this process. The viable cells of the single-cell protein material are killed during the extraction step of the present process. When the viable cells come in contact with the aqueous aliphatic alcohol extractant which contains from 60 to 80 vol. percent alcohol, the said cells are killed almost immediately.

Whether the viable cells of the single-cell protein material are heat-killed by pasteurization or killed almost immediately when contacted with the aqueous aliphatic alcohol extractant containing 60 to 80 vol. percent alcohol, dead cells are produced in both instances.

We have found that undesirable flavor components can be extracted from single-cell microbial materials by use of an extraction solvent comprising aqueous alcohol, where the alcohol contains 1 to 3 carbon atoms per molecule and the alcoholic solvent contains 20 to 40 vol. percent water. The SCP material is not degraded as to other properties and, as recovered in good yield, has a bland flavor. Odor properties are similarly improved.

Our invention is particularly applicable to the affording of a bland-tasting SCp material when operating upon previously dried single-cell microbial organisms grown on an ethanol-containing substrate with an alcoholic solvent comprising methanol, ethanol, n-propanol or isopropanol.

Other yeasts and bacteria grown upon a variety of substrates have been improved substantially in respect of taste and odor qualities when treated by the process of this invention.

DESCRIPTION OF PREFERRED EMBODIMENTS

We have found that an alcohol-water mixture, containing 60 to 80 vol. percent of a $C_1$–$C_3$ alcohol, effectively extracts undesirable flavor and odor components from SCP-containing material without degrading other properties of the product. Accordingly a major limitation upon the use of SCP material as a food or food ingredient is removed. Utilization of SCP materials in foods for human consumption is now more attractive because their high protein content with good amino acid profile is preserved while negative characteristics have been minimized. Improved digestibility has been indicated by feeding tests, increased shelf life has been observed, and increased holding capacity for water and oil is observed when treated SCP material is incorporated in ground beef.

Any microbial cell material can be treated according to the extraction process of this invention. In a fully integrated, continuous system, the microbial cells are conveniently grown in a fermentation stage where oxygen and a suitable substrate such as a liquid or gaseous hydrocarbon, an alcohol or a carbohydrate together with a nutrient solution containing vitamins and minerals are fed to a stirred reactor containing the microorganisms. The growth rate of microorganisms on the substrate is typically exponential in nature. As the microorganism concentration increases, a portion of the fermentation broth is withdrawn from the stirred reactor and the cellular microorganisms separated therefrom. Although a pasteurized or unpasteurized cell paste concentrate may be employed in the process of this invention, best results have been obtained when treating a pasteurized or unpasteurized product that has previously been isolated and dried; i.e., brought to a moisture content no greater than about 8 wt. percent and preferably about 5 wt. percent.

By way of illustration, bacteria such as those listed in Table I and yeasts such as those listed in Table II are suitable microorganisms for use as starting materials in the practice of this invention.

TABLE I — SUITABLE BACTERIA

*Acetobacter sp.*
*Arthrobacter sp.*
*Bacillus subtilus*
*Corynebacterium sp.*
*Micrococcus sp.*
*Mycobacterium sp.*
*Nocardia sp.*
*Pseudomonas sp.*

TABLE II — SUITABLE YEASTS

*Candida curvata*
*Candida lipolytica*
*Candida pulcherima*
*Candida utilis*
*Hansenula anomala*
*Oidium lactis*
*Saccharomyces carlsbergensis*
*Saccharomyces cerevisiae*
*Saccharomyces fragilis*
*Trichosporon cutaneum*

The use of *Candida utilis*, *Saccharomyces cerevisiae*, *Saccharomyces fragilis*, or *Saccharomyces carlsbergensis* is preferred for the process of this invention, however, because each has F.D.A. approval for use in food products. Although the use of whole cells is preferred in the practice of this invention, broken-cell material may similarly be employed.

The extraction process of this invention may employ any feasible arrangement of equipment but should generally provide for a contacting zone, a separation zone and a solvent recovery zone. The contacting zone may comprise a simple mixing vat, an agitated vessel, a baffled rotating drum, a screw-feed countercurrent flow contactor, a percolation vessel, or other appropriate solid-liquid contacting device. In a preferred arrangement glass-lined vessels and stainless steel piping and fittings are employed.

The contacting step may be effected in stages and may be operated in either a batch or continuous manner. Separation of purified SCP material may be effected by filtration, decantation, centrifugation or other means. Combination filtration-extraction equipment may also be employed. If staging is not employed there should preferably be provision made for washing the extracted SCP material with fresh solvent to maximize separation of the extract components.

In the typical operation of this invention at least a portion of the solvent will be recovered for reuse. This may be done by vaporization and condensation, as in a flash distillation apparatus, whereby the alcohol-water solvent is taken overhead and an extract material is recovered as a bottoms product.

The SCP material, purified by extraction with aqueous alcohol, must be freed of residual alcohol, except possibly when ethanol has been employed in the extraction solvent. This drying step may be effected in any typical desolventizing equipment. In a preferred operation the wet cell product is worked mechanically during the desolventizing to avoid the formation of large agglomerates. Coarse cell product particles should pass through an 8-mesh standard screen. Both oven-drying and spray-drying techniques may be employed with proper selection of time and temperature (generally in the range from 50° to 100°C.) dependent upon the desired final moisture content and physical form of the purified SCP material. In some instances the dried material may require a further moistening with water and a re-drying operation, preferably in a drying oven at about 80° to 100°C. If desired, a fine-grinding step may be included to afford particles passing through screens in the range from 50- to 100-mesh.

Where feasible, provision may be made for recovery of vaporized solvent for combination with other recovered solvent for recycle to the contacting zone. Where stripping of purified SCP material has been effected with an oxygen-containing gas stream and the alcohol component of the solvent is also employed in the fermentation substrate, the effluent stripping gas may be directed to the fermentor to provide both oxygen and alcohol for microbial cell growth.

The alcohols suitable for use in our invention are the lower aliphatic alcohols which are completely miscible with water and are sufficiently volatile to permit removal simply from purified, extracted microbial cell material without exposure to severe processing conditions. We have found that suitable alcohols include methanol, ethanol and the propanols. A preferred alcohol is ethanol.

The extraction process employing an alcoholic solvent is most effective in producing a bland tasting SCP material when about 10 to 25 wt. percent of the original microbial cell material (dry basis) is removed. The removed material comprises fats, sterols, phospholipids, non-protein nitrogenous compounds and others that contribute to the customary undesirable taste and odor qualities of yeasts and bacteria products. Anhydrous alcohol has been found to remove only a portion of these undesirable components while dilute aqueous alcohol not only is less selective for the undesirable components but also leaves the extracted solids in a flocculent state not readily filterable. We have found that the optimum extraction of undesirable components is achieved when employing a $C_1$-$C_3$ alcohol, preferably ethanol, together with 20 to 40 vol. percent water. In a quite unexpected manner, this particular range of alcohol and water concentrations also affords the best separation characteristics in the slurry of cells and solvent. Accordingly, the solvent system for the extraction process of our invention should be formulated to contain 60 to 80 vol. percent of the appropriate alcohol, the remaining portion being water.

The process of our invention may be operated at any temperature within the range from room temperature (about 20°C.) up to about 100°C., preferably within the range from 50° to 80°C. Generally, the preferred temperature will be no higher than the atmospheric boiling point of the selected alcohol-water azeotrope although, where the extraction equipment permits, super-atmospheric pressure may be employed in order to achieve a higher extraction temperature.

The time required for effecting the desired depth of extraction will vary inversely with the degree of dispersion of the solid in the solvent but will usually be at least 0.1 hour, but within the range from 0.5 to 5.0, preferably 0.1 to 2.0 hours. Where staging is employed the time employed in successive stages may be varied but the total time will usually fall within the above limits.

The weight ratio of solvent to solid effective for achieving the desired depth of extraction will vary inversely with the temperature employed but will usually be within the range from 3:1 to 7:1.

It is contemplated that single-cell microbial organisms once filtered in accordance with this invention can be subjected to additional slurrying, agitating and filtering steps.

The process of this invention may be employed to improve the food quality of any appropriate single-cell microorganism material. In particular, our process has been employed successfully in improving the flavor and odor quality characteristics of various yeasts grown on a variety of substrates. These yeasts include brewers' yeast (*Saccharomyces cerevisiae*), Torula yeast grown on waste sulfite liquor, a yeast of the genus *Candida* grown on a paraffinic gas-oil hydrocarbon substrate, and a yeast (*Candida utilis*) which has been treated under conditions whereby its nucleic acid content had been reduced. In each instance, aqueous alcohol extraction according to the process of this invention gave a product having a bland taste and, overall, improved flavor and odor properties.

Surprisingly, similar improvement was found with respect to extract yield, ease of extraction and separation, and improvement in flavor and odor qualities when the yeast cells contained in a paste or aqueous slurry had first been broken, as by use of a French press. It appears that the water-dispersible cell protein is coagulated in the presence of the aqueous alcohol and thereafter behaves in this process as any other whole cell material and is not lost as extract. Treatment of the alcohol-extracted ruptured-cell material with sodium hydroxide yields a sodium proteinate having improved flavor.

Our process may be applied to single-cell microorganisms immediately after harvesting, after washing, after dewatering or drying, or after other processing operations but preferably after drying. When applied to a pasteurized or unpasteurized cell-cream or cell paste the volume of water associated therewith must be known so that sufficient alcohol or alcohol-water azeotrope may be added to provide the desired alcohol concentration in the initial solvent extraction stage.

A preferred application of our invention relates to the improved quality properties developed in the yeast cells of the strain *Candida utilis* as grown on an ethanol substrate and dried prior to extraction treatment. In this application ethanol-water, preferably about 70 vol. percent ethanol –30 vol. percent water, is employed as solvent so that a common, non-toxic alcohol is present both as substrate and as extractant. This sytem affords an improved flavor and odor in the extracted yeast product, introduces no extraneous substance having a toxic nature, and simplifies the recovery of solvent. A portion of the extract solution may be fed to the fermentor without further treatment, other than possibly a sterilization step, to provide the required substrate carbon source. The remainder of the extract solution may be sent to solvent recovery in the usual fashion. When drying the extracted cell material product any ethanol vapors may be recovered from a drying air stream or, optionally, the ethanol vapor-air mixture may be charged to the fermentor to supply both the requisite oxygen and additional substrate material.

EXAMPLES

The following examples are illustrative of our invention.

EXAMPLE I

Drum-dried Torula yeast (*Candida utilis*) having a distinctive yeasty odor and taste, was subjected to extraction with each of the solvents shown in Table III for a period of about 16 hours. These extractions were conducted at the boiling points of the respective solvents in a Soxhlet extractor (except as noted). Among these solvents only ethanol gave a definite improvement in flavor but the desired bland flavor character was not achieved.

EXAMPLE II

Spray-dried Torula yeast (*Candida utilis*) was subjected to a series of qualitative extraction experiments employing ethanol, water and mixtures thereof. The yeast was mixed with the test solvent at 50°C., allowed to settle and finally filtered through filter paper. The examination of the extracts and filtrates is summarized in Table IV. Good settling and rapid filtration, coupled with extraction of a relatively large amount of material from the yeast, was observed only when the extraction solvent contained 60 or 80 vol. percent ethanol.

EXAMPLE III

Extraction studies were conducted with ethanol-water mixtures containing 60, 70 and 80 vol. percent ethanol. Yeasts examined included both laboratory and commercial samples of spray-dried Torula yeasts, as well as yeast paste either taken directly from the centrifuge or subjected thereafter to cell rupture by extrusion from a French press. Extractions were conducted in a Soxhlet extractor for about 16 hours. Composition of the extractor charge was calculated to provide the desired alcohol concentration in the extraction zone. After extraction was terminated, the yeast residue was dried at 100°C. The extract material was recovered from the solvent by evaporation on a steam bath. Results of these studies are summarized in Table V.

Marked improvement in flavor was noted in all instances, including that of the comparatively poor quality commercial Torula yeast. Extract yield and ease of extraction were not affected by first breaking the cells.

EXAMPLE IV

Spray-dried Torula yeast (*Candida utilis*) was subjected to a series of extraction experiments employing isopropanol alone and in mixtures with water. In each experiment 1 gram of yeast was contacted with 50 ml. solvent at room temperature, allowed to settle and finally filtered through filter paper. The examination of the cake, filtrate and extract is summarized in Table VI. Based on filtration performance and rate of re-settling, coupled with extraction of a substantial amount of material from the yeast, the optimum solvent composition contained 60 to 80 vol. percent isopropanol.

EXAMPLE V

The extraction technique described in Example III was employed with debittered brewers' yeast, Torula yeast grown on waste sulfite liquor, Torula yeast grown on a gas-oil hydrocarbon fraction, and a yeast (*Candida utilis*) having a reduced nuclei acid content. In each instance marked improvement in flavor of the extracted yeast was observed. Additionally, the process of this Example removed the bitter hop flavor from fresh brewers' yeast, thus avoiding the necessity for an alkali-washing step.

EXAMPLE VI

Cells of the bacterial strain *Nocardia sp.*, grown on a butane substrate, were extracted at 45°–50°C. for 0.5 hour employing as extraction solvent aqueous isopropanol containing 20 vol. percent water. Marked improvement was noted in color and odor of the extracted cells.

EXAMPLE VII

The technique of Example VI was employed with isopropanol containing 40 vol. percent water. A similar improvement was noted in the color and odor of the extracted cells.

EXAMPLE VIII

Spray-dried Torula yeast (230 g.) was treated with two 1200 ml. portions of a 70 vol. percent isopropanol-30 vol. percent water mixture at 65°C. The extracted product was then dehydrated by contacting with a 1200 ml. portion of anhydrous isopropanol. After drying for 12 hours at 50°C. and finally drying at 100°C. the yeast possessed a flavor objectionable only due to the presence of a residual solvent taste. Subsequent wetting with water and re-drying at 100°C. removed the objectionable solvent taste.

EXAMPLE IX

A slurry containing 19 wt. percent yeast cells (*Candida utilis*) in aqueous ethanol (75 vol. percent ethanol) was charged continuously to the top of a counter-current extraction column at the rate of 370 g./hour cells. The same aqueous ethanol solvent composition was charged upflow in the extractor at the rate of 3000 ml./hour. Column temperature was maintained at about 65°C. Extracted cells were recovered after filtration at the rate of 296 g./hour as a cake containing about 50 wt. percent cells in solvent. Effluent solvent from the top of the extractor was purified by flashing and condensed for recycle. Extract was recovered from the flash bottoms at the rate of 74 g./hour together with some solvent.

After removal of alcohol, the extract separated into a waxy phase and a water-soluble phase. The waxy phase contained phospholipids.

The recovered cell cake was broken up and dried for 12 hours at 50°C. After coarse grinding to pass a 9-mesh screen, the extracted cell material was dried further for 12 hours at 50°C. and finally fine-ground to pass through 0.01 inch slots.

In an alternate procedure the coarse-ground material was wetted with water, dried at 50°C., ground to pass through 0.01 inch slots and finally dried in an oven at 100°C. This product exhibited a preferred combination of properties for use in foodstuffs intended for human consumption, including bland taste, minimum odor, high protein efficiency ratio in feeding tests, good storage stability and excellent holding capacity for water or oil in meat formulations.

TABLE III

Extraction of Drum-Dried Torula Yeast

| Solvent | Extract Yield, wt. % | Character of Residue |
| --- | --- | --- |
| Hexane | 1.0 | No flavor improvement |
| Benzene | 1.1 | " |
| Toluene | — | " |
| Sulfur dioxide | — | SO$_2$ taste present |
| Diethyl ether | 0.8 | No flavor improvement |
| Chloroform | 1.7 | " |
| Ethanol, 35% Benzene, 65% | 2.4 | " |
| Ethanol | 4.3, 4.6 | Definite flavor improve. |
| Methanol, 35% Chloroform, 65% | 6.8 | Chloroform taste present |
| Water (90°C.) | 17.0 | Mushroom flavor present |

TABLE IV

Extraction of Spray-Dried Torula Yeast with Ethanol-Water

| Solvent vol. % ethanol | Character of Mixture Supernatant Phase | Cake Volume[a] | Filtrate | Character of Filtration Filtration time, minutes[b] | Character of Extract |
| --- | --- | --- | --- | --- | --- |
| 100 | Cloudy | 1 | Clear, water-white | 15 | Small, oily |
| 80 | Clear, slightly yellow | 5 | Clear, light yellow | 6 | Substantial, solid |
| 60 | Clear, yellow | 3 | Clear, yellow | 6 | Large, solid |
| 40 | Cloudy, slightly yellow | 2 | Clear | >60 | Medium, brittle solid |
| 20 | Cloudy, slightly yellow | 14 | Cloudy | >>60 | — |
| 0 | Cloudy, slightly yellow | 3 | Cloudy | >>60 | — |

[a] An arbitrary rating: 1 = small volume, 14 = large volume with little settling
[b] Time required to filter 30 ml. of the suspension.

TABLE V

Extraction of Torula Yeast with Ethanol-Water

| Solvent vol.% ethanol | Yield, Wt.% | Extract Description | Character of Residue |
| --- | --- | --- | --- |
| | | Spray-Dried Yeast | |
| 60 | 20.0 | Brown, gummy solid | Hard solid, bland taste |
| 70 | 17.5, 18.0, 18.6 | Brown, gummy solid | Friable solid, bland taste[a] |
| 70 | 19.2 | Black, gummy solid | Friable solid, improved flavor[b] |
| 70[c] | 19.5 | Brown, gummy solid | Friable solid, improved flavor but noticeable ammonia taste |
| 80 | 17.4 | Brown, gummy solid | Friable solid, bland taste |
| | 20.6 | Tan solid[d] | |
| | | Yeast Paste from Centrifuge | |
| 70 | 18.0 | Similar to spray-dried series | |
| | | Yeast Paste from French Press | |
| | | Similar to spray-dried series | |

[a] Nitrogen analysis indicated a higher nominal protein content than in the charge material.
[b] Commercial Torula yeast employed in this experiment.
[c] Solvent also contained 3% ammonia.
[d] Dried under vacuum at room temperature.

TABLE VI

Extraction of Torula Yeast with Isopropanol-Water

| Solvent, vol.% isopropanol | Settling Rate[a] | Extract Supernatant color | Concentration in supernatant g/25 ml | Character of solid | Residue Filter rate[b] | Settled cake depth[c] | Relative re-settling rate[d] |
| --- | --- | --- | --- | --- | --- | --- | --- |
| 40 | 16 | yellow | 0.11 | finely divided | 120 | 24 | 3 |
| 50 | 22 | " | 0.10 | " | 77 | 22 | 2[e] |
| 60 | 25 | " | 0.10 | " | 57 | 22 | 1 |
| 70 | 9 | " | 0.08 | heavy curd | 54 | 28 | 1 |
| 80 | 5 | " | 0.07 | " | 34 | 33 | 1 |
| 90 | 3 | " | 0.03 | " | 39 | 44 | 2 |
| 100 | 46 | clear | 0 | finely divided | 142 | 9 | 3 |

[a] Mm. supernatant liquid developing in test tube in 15 minutes.
[b] Time in seconds for 10 ml. to pass through the filter.
[c] Measured in thirty-seconds of an inch.
[d] Arbitrary scale: 1 = good, 3 = poor
[e] Supernatant liquid was cloudy.

We claim:

1. A process for improving the flavor characteristics of heat-killed single-cell microbial organisms, comprising the steps of:

a. heat-killing the single-cell microbial organisms by pasteurization;

b. drying said heat-killed single-cell microbial organisms to a moisture content no greater than about 8 wt. percent;

c. preparing a slurry of the dried single-cell microbial organisms with an aqueous alcoholic solution containing 60 to 80 vol. percent of an aliphatic alcohol having 1 to 3 carbon atoms per molecule in an amount to provide a weight ratio of alcoholic solution to single-cell microbial organisms within the range from 3:1 to 7:1;

d. agitating the slurry at a temperature in the range from 20° to 100°C. for a period of 0.1 to 2.0 hours;

e. filtering the slurry to recover an extracted single-cell microbial organisms; and f. drying the extracted single-cell microbial organisms to yield a substantially solvent-free product.

2. The process of claim 1 wherein the aliphatic alcohol is ethanol.

3. The process of claim 1 wherein the single-cell microbial organism is a yeast product.

4. The process of claim 3 wherein the yeast is selected from the group consisting of *Saccharomyces cerevisiae*, *Saccharomyces carlsbergensis*, *Saccharomyces fragilis* and *Candida utilis*.

5. The process of claim 4 wherein the yeast is *Candida utilis*.

6. The process of claim 1 wherein the single-cell microbial food product is a bacteria product.

7. The process of claim 6 wherein the aliphatic alcohol is ethanol.

8. The process of claim 1 wherein the substantially solvent-free product is additionally ground to a fine particle size, wetted with water and dried at a temperature in the range from 50° to 100°C.

9. The process of claim 1 wherein the slurry is agitated at a temperature in the range from 50° to 80°C.

10. The process of claim 1 wherein the extracted material from step (e) is (1) slurried with an aqueous alcoholic solution containing 60 to 80 vol. percent of an aliphatic alcohol having 1 to 3 carbon atoms per molecule in an amount to provide a weight ratio of alcoholic solution to single-cell microbial organisms within the range from 3:1 to 7:1; (2) agitated at a temperature in the range from 20° to 100°C. for a period of 0.1 to 2.0 hours; and (3) filtered to recover an extracted single-cell microbial organisms.

11. A process for upgrading heat-killed single-cell protein materials derived from single-cell microbial organisms grown by fermentation on a suitable organic substrate and intended for use in food products, comprising the steps of:
 a. isolating a harvest of said cells from the fermentation broth;
 b. washing the harvested cells with water;
 c. dewatering the washed cells to yield a cell paste;
 d. heat-killing the single-cell microbial organisms in said paste by pasteurization;
 e. drying the cell paste containing said heat-killed cells to a moisture content no greater than about 8 wt. percent;
 f. slurrying the dried cells with an aliphatic alcohol, selected from the group consisting of methanol, ethanol, n-propanol and isopropanol, and water to provide an aqueous alcoholic solution containing 60 to 80 vol. percent alcohol and in an amount selected to provide a weight ratio of alcoholic solution to dried cells within the range from 3:1 to 7:1;
 g. extracting the cells by contacting with the aqueous alcoholic solution at a temperature in the range from 20° to 100°C. for at least 0.1 hour;
 h. separating the extracted cells from the aqueous alcoholic solution; and
 i. drying the extracted cells to yield a substantially solvent-free product.

12. The process of claim 11 wherein the aliphatic alcohol is ethanol.

13. The process of claim 11 wherein the harvested cells of single-cell microbial organisms comprise a yeast selected from the group consisting of *Saccharomyces cerevisiae*, *Saccharomyces carlsbergensis*, *Saccharomyces fragilis* and *Candida utilis*.

14. The process of claim 13 wherein the yeast is *Candida utilis*.

15. The process of claim 11 wherein the harvested cells of single-cell microbial organisms comprise bacteria.

16. The process of claim 11 wherein the cells are contacted with the aqueous alcoholic solution at a temperature in the range from 50° to 80°C. for a period of 0.1 to 2.0 hours.

17. A process for the production of purified single-cell protein material from single-cell microbial organisms, grown in a fermentor on a substrate comprising aqueous ethanol and afforded as a heat-killed, water-washed and dried cell paste, comprising the steps of:
 a. heat-killing the single-cell microbial organisms by pasteurization;
 b. drying said heat killed single-cell microbial organisms to a moisture content no greater than 8 wt. percent;
 c. diluting the said dried cell paste with sufficient ethanol-water azeotrope and additional water to provide a slurry of microbial cells in aqueous ethanol containing 60 to 80 vol. percent ethanol, said slurry providing a weight ratio of aqueous ethanol to microbial cells within the range from 3:1 to 7:1;
 d. agitating the slurry for a period of 0.5 to 5.0 hours at a temperature in the range from 20° to 80°C;
 e. filtering the slurry to provide an aqueous ethanolic extract solution and a purified single-cell protein material;
 f. separating the aqueous ethanolic extract solution into two portions;
 g. distilling the first portion of extract solution to recover overhead an ethanol-water azeotrope;
 h. cycling the recovered ethanol-water azeotrope to the dried cell paste dilution step; and
 i. drying the purified single-cell protein material to yield a substantially solvent-free product.

18. A process of claim 17 wherein the remaining portion of extract solution from step (f) is fed to the fermentor to provide substrate for single-cell microbial growth.

19. The process of claim 17 wherein the purified single-cell protein material is dried in a drying zone in a stream of an oxygen-containing gas at a temperature in the range from 50° to 100°C. and the effluent gas stream from the drying zone containing additional recovered ethanol, is fed to the fermentor.

20. The process of claim 17 wherein the dried purified single-cell protein material is subjected to further treatment comprising the steps of:
 a. grinding the cell material to afford coarse particles capable of passing through an 8-mesh screen;
 b. adding sufficient water to thoroughly moisten the coarse-ground particles;
 c. re-drying the moistened particles at a temperature of about 50°C.;
 d. re-grinding the re-dried particles to afford fine particles capable of passing through a 50-mesh screen; and
 e. further drying the fine-ground particles at a temperature in the range from about 50° to 100°C.

21. The process of claim 17 wherein the single-cell microbial organisms are yeast cells.

22. The process of claim 21 wherein the yeast is selected from the group consisting of *Saccharomyces cerevisiae*, *Saccharomyces carlsbergensis*, *Saccharomyces fragilis* and *Candida utilis*.

23. The process of claim 22 wherein the yeast is *Candida utilis*.

24. The process of claim 17 wherein the single-cell microbial organisms are bacteria.

* * * * *

UNITED STATES PATENT OFFICE
CERTIFICATE OF CORRECTION

PATENT NO. : 3,885,050

DATED : May 20, 1975

INVENTOR(S) : John A. Ridgway, Jr., et al.

It is certified that error appears in the above-identified patent and that said Letters Patent are hereby corrected as shown below:

Column 1, line 25  "or" should be -- of --.

Signed and Sealed this sixteenth Day of September 1975

[SEAL]

Attest:

RUTH C. MASON  
*Attesting Officer*

C. MARSHALL DANN  
*Commissioner of Patents and Trademarks*